(12) United States Patent
Kang et al.

(10) Patent No.: US 7,006,709 B2
(45) Date of Patent: Feb. 28, 2006

(54) SYSTEM AND METHOD DEGHOSTING MOSAICS USING MULTIPERSPECTIVE PLANE SWEEP

(75) Inventors: Sing Bing Kang, Redmond, WA (US); Richard S. Szeliski, Redmond, WA (US); Matthew T. Uyttendaele, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 665 days.

(21) Appl. No.: 10/172,859

(22) Filed: Jun. 15, 2002

(65) Prior Publication Data

US 2003/0235344 A1 Dec. 25, 2003

(51) Int. Cl.
*G06K 9/32* (2006.01)
(52) U.S. Cl. .................. 382/294; 382/154; 345/422
(58) Field of Classification Search ............... 382/276, 382/284, 293, 294, 295, 302, 154; 345/422
See application file for complete search history.

(56) References Cited

U.S. PATENT DOCUMENTS

| | | | | |
|---|---|---|---|---|
| 6,078,701 A | * | 6/2000 | Hsu et al. ............... | 382/294 |
| 6,097,854 A | | 8/2000 | Szeliski et al. ........... | 382/284 |
| 6,351,269 B1 | * | 2/2002 | Georgiev ................. | 345/629 |
| 6,507,665 B1 | * | 1/2003 | Cahill et al. ............. | 382/154 |
| 6,639,596 B1 | * | 10/2003 | Shum et al. .............. | 345/427 |
| 6,714,672 B1 | * | 3/2004 | Berestov et al. .......... | 382/154 |
| 6,750,873 B1 | * | 6/2004 | Bernardini et al. ....... | 345/582 |

OTHER PUBLICATIONS

S. B. Kang, R. Szeliski, and J. Chai. "Handling occlusions in dense multi-view stereo." In IEEE Computer Society Conference on Computer Vision and Pattern Recognition (CVPR '2001), vol. 1, pp. 103-110,Kauai, Hawaii,Dec. 2001.
P. Rademacher and G.Bishop. "Multiple-center-of-projection images." In Computer Graphics Proceedings, Annual Conference Series, pp. 199-206, Proc. SIGGRAPH '98 (Orlando),Jul. 1998.ACM SIGGRAPH.
H. -Y. Shum and R. Szeliski. "Construction of panoramic mosaics with global and local alignment." International Journal of Computer Vision, 36(2):101-130, Feb. 2000.

* cited by examiner

*Primary Examiner*—Joseph Mancuso
*Assistant Examiner*—Dennis Rosario
(74) *Attorney, Agent, or Firm*—Lyon & Harr, LLP; Mark A. Watson (57) ABSTRACT

A system and method for deghosting mosaics provides a novel multiperspective plane sweep approach for generating an image mosaic from a sequence of still images, video images, scanned photographic images, computer generated images, etc. This multiperspective plane sweep approach uses virtual camera positions to compute depth maps for columns of overlapping pixels in adjacent images. Object distortions and ghosting caused by image parallax when generating the image mosaics are then minimized by blending pixel colors, or grey values, for each computed depth to create a common composite area for each of the overlapping images. Further, the multiperspective plane sweep approach described herein is both computationally efficient, and applicable to both the case of limited overlap between the images used for creating the image mosaics, and to the case of extensive or increased image overlap.

26 Claims, 5 Drawing Sheets

SYSTEM AND METHOD DEGHOSTING MOSAICS USING MULTIPERSPECTIVE PLANE SWEEP

BACKGROUND

1. Technical Field

The invention is related to a system for mosaicing images, and in particular, to a system and method for minimizing object distortions and ghosting caused by image parallax.

2. Related Art

In general, image mosaics are a combination of two or more overlapping images that serve to present an overall view of a scene from perspectives other than those of the individual images used to generate the mosaic. In other words, image-based rendering techniques such as the creation of image mosaics are used to render photorealistic novel views from collections of real or pre-rendered images which allow a user or viewer to look in any desired direction. Such novel views are useful for virtual travel, architectural walkthroughs, video games, or simply for examining a scene or area from perspectives not originally captured or otherwise rendered. Typically, better final mosaicing results for a given scene or area are achieved by using many overlapping images having a large percentage of overlap between the images.

Unfortunately, using large sets of overlapping images having a high degree of overlap for generating mosaics is typically computationally expensive. Further, where the set of overlapping images available for generating a mosaic comprises a sparse or limited set of images taken at slightly displaced locations, the problem of ghosting due to the presence of parallax becomes a major concern. In general, ghosting can be described as a visual artifact resulting from parallax that is frequently observed when images captured from different camera positions are either stitched, mosaiced, or otherwise combined. Specifically, any deviations from a pure parallax-free motion model or an ideal pinhole camera model can result in local misregistrations between the combined images. These misregistrations are typically visible as a loss of detail, such as blurring, or as two or more overlapping semi-transparent regions in the mosaiced images, i.e., ghosting.

There are several existing schemes for addressing ghosting when mosaicing images. For example, one conventional scheme uses a local patch-based deghosting technique in an attempt to address the problem. This scheme provides a system for constructing panoramic image mosaics from sequences of images. This scheme constructs a full view panorama using a rotational mosaic representation that associates a rotation matrix and, optionally, a focal length, with each input image in a sequence of images.

This scheme then uses a patch-based alignment algorithm which uses motion models to align two sequential images. In order to reduce accumulated registration errors between such images, a global alignment, or "block adjustment" is first applied to the whole sequence of images, which results in an optimally registered image mosaic. To compensate for small amounts of motion parallax introduced by translations of the camera and other unmodeled distortions, a local alignment technique for deghosting the combined images is used. This local alignment technique warps each image based on the results of pairwise local image registrations. Combining both the global and local alignment, serves to improve the quality of image mosaics generated using this scheme.

Unfortunately, while useful, because the aforementioned patch-based deghosting technique is purely image-based, it is only capable of addressing small amounts of motion parallax. Consequently, this scheme can not fully address significant parallax problems. Further, the corrective warping used in this patch-based deghosting technique often produces unrealistic-looking results. In addition, the patch-based deghosting technique summarized above tends to be computationally expensive.

Another conventional scheme for addressing the problem of parallax induced ghosting in stitched or mosaiced images involves the use of dense sampling to overcome the ghosting problem. Effectively, this dense sampling requires the use of images having significant overlapping regions. Specifically, this scheme provides for synthesizing an image from a new viewpoint using data from multiple overlapping reference images. This synthesized image is constructed from a dataset which is essentially a single image that is produced by combining samples from multiple viewpoints into a single image. Unfortunately, this scheme can not provide a satisfactory solution in the case of sparse sampling, such as where overlap between images is 50% or less and where parallax is a significant concern. In addition, because of the dense sampling, the aforementioned scheme tends to be computationally expensive.

Therefore, what is needed is a computationally efficient system and method for deghosting image mosaics. Further, this system and method should be capable of deghosting image mosaics even in the case where there is significant parallax, or where there is limited overlap between images used for creating the image mosaics.

SUMMARY

A system and method for deghosting mosaics as described herein solves the aforementioned problems, as well as other problems that will become apparent from an understanding of the following description by providing a novel "multiperspective plane sweep" approach for generating an image mosaic from a sequence of still images, video images, scanned photographic images, computer generated images, etc. This multiperspective plane sweep approach uses virtual camera positions to compute depth maps for strips of overlapping pixels in adjacent images. These strips, which are at least one pixel in width, are perpendicular to camera motion. For horizontal camera motion, these strips correspond to pixel columns. Even if the camera motion is not horizontal, the images are warped or "rectified" to produce an effective horizontal camera motion. From this point on, the discussion assumes horizontal camera motion for ease of discussion. However, as should be appreciated by those skilled in the art, the system and method for deghosting mosaics as described herein, applies to arbitrary camera motions and translations.

Object distortions and ghosting caused by image parallax when generating the image mosaics is then minimized by blending pixel colors, or grey values, for each computed depth to create a common composite area for each of the overlapping images. Further, the multiperspective plane sweep approach described herein is both computationally efficient, and applicable to the case of limited overlap between the images used for creating the image mosaics. Note the multiperspective plane sweep approach described herein also works well in cases of increased image overlap.

In general, the multiperspective plane sweep (MPPS) technique described herein addresses the problem of ghosting and distortion resulting from image parallax effects by considering the problem from a geometric point of view. Specifically, given two or more of images that are to be stitched or combined to form a composite mosaic image, a perspective warping is first applied to the images to put them into a common plane. Overlapping regions of the warped images are then identified. These overlapping regions are then subdivided into columns having one or more pixels in width. Virtual camera positions are then associated with each column and used with a multiperspective plane sweep to determine a relative depth for each of the pixels in each column. The relative depth is then used in combination with each of the virtual camera positions to identify particular pixels for blending to create a composite overlapping region common to each of the overlapping images.

The perspective warping of the images requires that certain information regarding the camera used to acquire an image, such as, for example, camera position, focal length, field of view, and orientation are known. Similarly, in the case of computer generated or rendered images, the equivalent information is typically available as if a virtual camera having known parameters at a known point in space had been used to acquire the image. Note that any discussions throughout this description that refer to a camera location for acquiring an image also apply equally to virtual viewing origins for computer generated images produced without the use of an actual camera.

In either case, perspective warping of an image simply means to digitally process the image so that it appears that the image was captured or rendered from the perspective of a different camera location or point of view, rather than at the position or point of view from which the image was either originally captured or rendered. For example, with respect to the MPPS techniques described herein, perspective warping of images is used to warp overlapping images so that each image appears to be in the same plane.

Once the images have been warped, any of a number of conventional alignment techniques is used to identify overlapping regions between two or more images which are to be composited. Non-overlapping regions are then associated with their respective original camera locations (or rendering origins), while each column of pixels in overlapping areas of the images are associated with virtual camera locations existing between the two original camera locations. The use of such virtual camera locations serves to minimize object distortion, which is unavoidable, while producing a practically seamless composite image. Computing the appearance of each column within the overlapping region is accomplished using a modification of a conventional plane sweep technique. This modification is termed "multi-perspective plane sweep" (MPPS), because the plane sweep for every column in the overlapping region is computed using a different virtual camera position.

Conventional plane sweep algorithms are used for computing a relative depth of pixels in overlapping images. In particular, plane sweep algorithms operate by considering each candidate disparity as defining a plane in space, and project all images to be matched onto that plane using a planar perspective transforms (homography). A per-pixel fitness metric (e.g., the variance of the corresponding collection of pixels) is first computed, and this is then aggregated spatially using an efficient convolution algorithm such as a moving average box filter or some other technique. After all the cost functions have been computed, a winning disparity is chosen. If the planes are processed in front to back order, occlusion relationships can also be included.

Note that such plane sweep techniques are well known to those skilled in the art, and will not be discussed in detail herein.

Also, as noted above, other methods for computing the depth of overlapping pixels can also be used. For example, in the case of actual images, a laser or radar range finder can be used with the camera to accurately measure the true depth of every pixel in the image. Similarly, in the case of many computer rendered images, the images are generated based on a three-dimensional model or models where the relative depth of all pixels in the rendered image is known at the time the image is rendered. In alternate embodiments, these depth maps are used in the same manner as the depth maps generated using the multi-perspective plane sweep.

In the pixel color assignment step, the computed depth, whether from the MPPS, or from another depth mapping technique, is used to index the colors or grey values from the input images. Specifically, given the computed depth map at each virtual camera location, a vector is projected from each actual camera location through the overlapping image region to the computed depth at that virtual camera location for each pixel in the column. The pixel values at the points where each of these vectors pass through the overlapping image region are then blended to create a composite image pixel at the point on the image plane corresponding to the virtual camera location. Further, this same pixel value is assigned to each of the overlapping images such that a common composite area is created for each of the overlapping images.

Further, in one embodiment, blending weights are used to weight the pixels being blended. In particular, those pixels that are closer to a camera or rendering point are weighted more heavily than those pixels that are further from a camera or rendering point. In other words, the pixels are weighted based on the proximity to the edge of the overlap region and to the camera or origin used to acquire or render the image. In alternate embodiments, these blending weights are any conventional linear or non-linear weighting function.

In view of the preceding discussion, it is clear that the MPPS techniques described herein are advantageous for use in generating seamless mosaics in cases of sparse sampling, such as where overlap between images is 50% or less, where parallax is a significant concern, and where computational resources are limited.

In addition to the just described benefits, other advantages of the multiperspective plane sweep techniques described herein will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
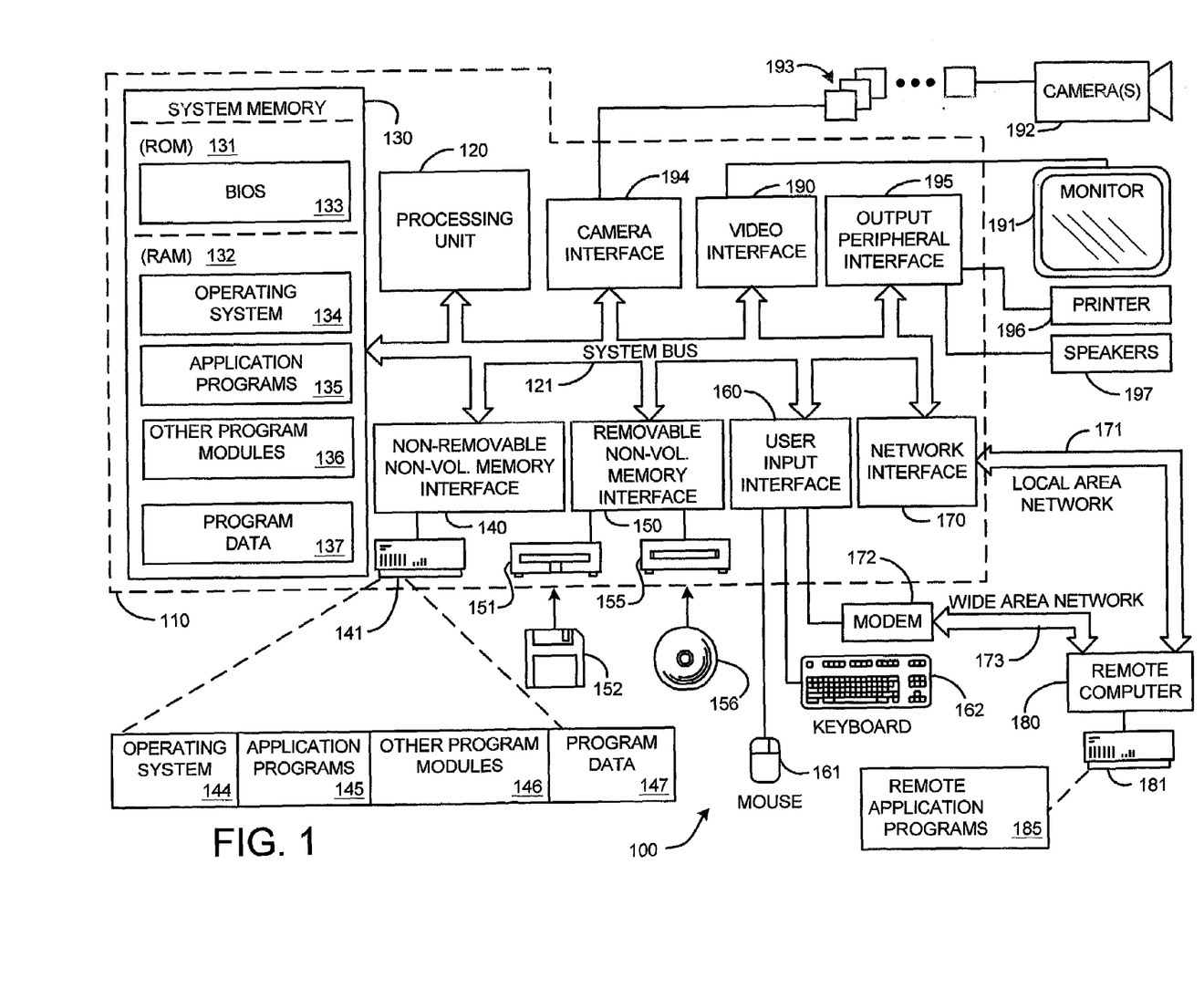
FIG. 1 is a general system diagram depicting a general-purpose computing device constituting an exemplary system for using a multiperspective plane sweep to combine two or more images into a seamless mosaic.

1.0 Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media.

The aforementioned term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras could be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194. This interface is connected to the system bus 121, thereby allowing the images 193 to be routed to and stored in the RAM 132, or any of the other aforementioned data storage devices associated with the computer 110. However, it is noted that image data can be input into the computer 110 from any of the aforementioned computer-readable media as well, without requiring the use of a camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying use of a multiperspective plane sweep to combine two or more images into a seamless mosaic.

2.0 Introduction:

The multiperspective plane sweep techniques described herein are useful for minimizing object distortions and ghosting caused by image parallax when generating mosaics from a sequence of still images. Minimization of object distortions and ghosting is achieved using virtual camera positions in combination with image depth map based pixel blending for overlapping portions of images. In a working embodiment, the image depth maps are created using a "multi-perspective plane sweep" to determine a relative depth of overlapping strips or columns of pixels in overlapping images of a scene. However, other methods for generating depth maps for the overlapping columns of pixels can also be used in further embodiments.

In general, a system and method for deghosting mosaics provides a novel multiperspective plane sweep approach for generating an image mosaic from a sequence of still images, video images, scanned photographic images, computer generated images, etc. This multiperspective plane sweep approach uses virtual camera positions to compute depth maps for columns of overlapping pixels in adjacent images. Object distortions and ghosting caused by image parallax when generating the image mosaics are then minimized by blending pixel colors, or grey values, for each computed depth to create a common composite area for each of the overlapping images. Further, the multiperspective plane sweep approach described herein is both computationally efficient, and applicable to both the case of limited overlap between the images used for creating the image mosaics, and to the case of extensive or increased image overlap.

2.1 System Overview:

In general, the multiperspective plane sweep (MPPS) technique described herein addresses the problem of ghosting and distortion resulting from image parallax effects by considering the problem from a geometric point of view. Specifically, given two or more of images that are to be stitched or combined to form a composite mosaic image, a perspective warping is first applied to the images to put them into a common plane. Overlapping regions of the warped images are then identified. These overlapping regions are then subdivided into subregions having one or more pixels in width. For example, in the case of two images with horizontal camera motions, a subregion corresponds to a pixel column. Further, in the most general case, with more than two cameras at arbitrary locations, a subregion can be as small as a single pixel in overlapping images. Note that even if the camera motion is not horizontal, the images are warped or "rectified" to produce an effective horizontal camera motion. For purposes of explanation, the following discussion addresses the case of two images with horizontal camera motions as an illustrative example. However, as should be appreciated by those skilled in the art, the system and method for deghosting mosaics as described herein, applies to arbitrary camera motions and translations. Virtual camera positions are then associated with each column and used with a multiperspective plane sweep to determine a relative depth for each of the pixels in each column. The relative depth is then used in combination with each of the virtual camera positions to identify particular pixels for blending to create a composite overlapping region common to each of the overlapping images.

Figure 2:
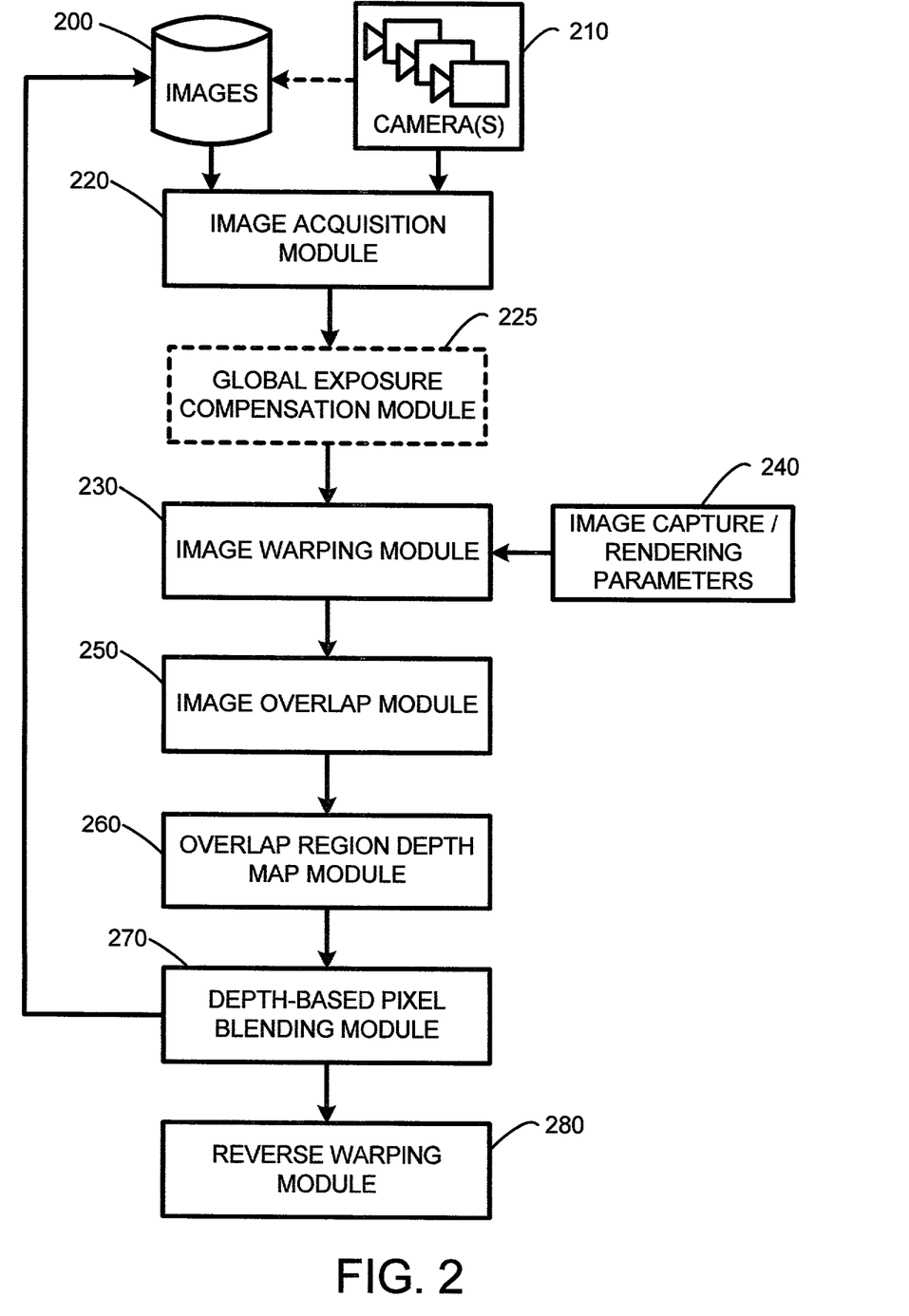
FIG. 2 illustrates an exemplary architectural diagram showing exemplary program modules for using a multiperspective plane sweep to combine two or more images into a seamless mosaic.

2.2 System Architecture:

The processes summarized above are illustrated by the general system diagram of FIG. 2. In particular, the system diagram of FIG. 2 illustrates the interrelationships between program modules for implementing deghosting using a multi-perspective plane sweep. It should be noted that the boxes and interconnections between boxes that are represented by broken or dashed lines in FIG. 2 represent alternate embodiments of deghosting methods described herein, and that any or all of these alternate embodiments, as described below, may be used in combination with other alternate embodiments that are described throughout this document.

In particular, as illustrated by FIG. 2, a system and method for deghosting mosaics uses images 200 from a database or collection of images stored in a computer readable medium. These images 200 are either captured by one or more cameras 210 or rendered using conventional computer image generation techniques. To begin, an image acquisition module 220 receives two or more overlapping images 200, which are either previously stored or acquired directly from the one or more cameras 210.

In one embodiment, the images 200 are then provided to a global exposure compensation module 225 which uses any of a number of conventional techniques for equalizing or compensating for exposure differences between each image. The global exposure compensation module 225 addresses exposure compensation parameters such as brightness and contrast levels using conventional exposure compensation techniques that are well known to those skilled in the art, and will not be discussed in further detail herein.

An image warping module 230 then applies a perspective warp to each of the overlapping images 200 so that the images are warped into a common viewing plane. The perspective warping module 230 uses well known conventional techniques for warping or "rectifying" images from one viewing perspective to another using image capture or rendering parameters 240 which include information, such as, for example, camera or rendering origin, field of view, focal length, and orientation.

The warped images are then provided to an image overlap module 250 that aligns the overlapping portions of the images using conventional image alignment techniques. The overlapping portions of the images are then divided into columns of at least one pixel in width. Note that at this point most overlapping images will exhibit signs of ghosting or blurriness in the overlap regions due to image parallax resulting from capturing or rendering the overlapping images from even slightly different perspectives. The ghosting and blurriness noted above then is addressed by the program modules discussed in the following paragraphs.

In particular, a depth map module 260 generates a depth map for the overlapping portions of each image. In a working embodiment of the deghosting system described herein, a multi-perspective plane sweep using virtual camera positions for each column of the overlapping portions of each image is used to compute relative depth maps. This process is discussed in greater detail in Section 3.1.2. In alternate embodiments, the depth maps can be created using other techniques, including, for example, the use of laser or radar range finding equipment for determining the actual depth of image pixels relative to a camera origin.

Next, a depth-based pixel blending module 270 uses the depth maps in combination with pixel information in the overlapping portions of each image to generate a composite pixel for each column of the overlapping images. Specifically, for each virtual camera location, given the computed depth maps for each column, the depth-based pixel blending module 270 projects a vector from each actual camera location through the overlapping image region to the computed depth for each pixel in the column.

The pixel values at the points where each of these vectors pass through the overlapping image region are then blended to create a composite image pixel at the point on an image plane corresponding to the virtual camera location for each column of the overlap region. Further, this same pixel value is assigned to each of the overlapping images such that for each column a common composite area is created for each of the overlapping images. Having a composite area serves to reduce or eliminate distortion, blurring and ghosting resulting from image parallax. This process is discussed in greater detail in Section 3.1.3.

In a related embodiment, the depth-based pixel blending module 270 uses "blending weights" to weight the pixels being blended. In particular, those pixels that are closer to a camera or rendering point are weighted more heavily than those pixels that are further from a camera or rendering point. In other words, the pixels are weighted based on the proximity to the edge of the overlap region and to the camera or origin used to acquire or render the image. In further embodiments, these blending weights are any conventional linear or non-linear weighting function.

Finally, a reverse warping module 290 exactly reverses or inverts the perspective warping applied to the images by the image warping module 220. Consequently, the images are put back into their original perspectives. However, these output images differ from the original input images in that they now have a common overlap area that differs only in the perspective from which the images were captured or rendered, with any potential ghosting or blurring effects minimized or eliminated by the aforementioned pixel blending procedures. These images 200 are then stored to computer readable medium for later use in viewing or creating image mosaics or image panoramas.

3.0 Operation Overview:

The system and method described herein for deghosting mosaics is applicable to actual images such as still images, video images, scanned photographic images, images acquired via film or digital cameras, etc., and to computer generated or processed images. However, for ease of explanation, the detailed description provided herein focuses on mosaicing a set of two or more images captured using a conventional camera having a known origin, field of view, focal length, and orientation. The above-described program modules are employed in a mosaic image deghoster for automatically deghosting overlapping portions of mosaiced images. This process is depicted in the flow diagram of FIG. 3 following a detailed operational discussion of exemplary methods for implementing the aforementioned programs modules.

3.1 Operational Elements:

In general, the MPPS techniques described herein addresses the problem of ghosting and distortion resulting from image parallax effects by performing a series of operations on overlapping pictures. In particular, given two or more overlapping images, a perspective warping is first applied to the images to put them into a common plane. Overlapping regions of the warped images are then identified and subdivided into columns of at least one pixel in width. Virtual camera positions are then associated with each column and used with a multiperspective plane sweep to determine a relative depth for each of the pixels in each column. The relative depth is then used in combination with each of the virtual camera positions to identify particular pixels for blending to create a composite overlapping region common to each of the overlapping images. The following sections describe in detail the operational elements for implementing an image deghoster using the processes summarized above and described in detail in the following sections.

3.1.1 Image Warping:

Perspective Warping of images is a well known conventional digital imaging technique for warping an image so that it appears that the image was captured or rendered from a perspective that is different than the perspective from which the image was actually captured or rendered. Perspective warping of images requires that certain information regarding the camera used to acquire an image, such as, for example, camera position, focal length, field of view, and orientation is either known, or can be computed or otherwise approximated. Similarly, in the case of computer generated or rendered images, the equivalent information is typically available as if a virtual camera having known parameters at a known point in space had been used to acquire the image. This type of perspective warping is also often referred to as image rectification, which is simply defined as a process of making image data conform to a desired map projection system. Note that such image warping or rectification techniques are well known to those skilled in the art, and will not be discussed in detail herein. It should also be noted that any discussions throughout this description that refer to a camera location or position for acquiring an image also apply equally to virtual viewing origins for computer generated images produced without the use of an actual camera.

Figure 3A:
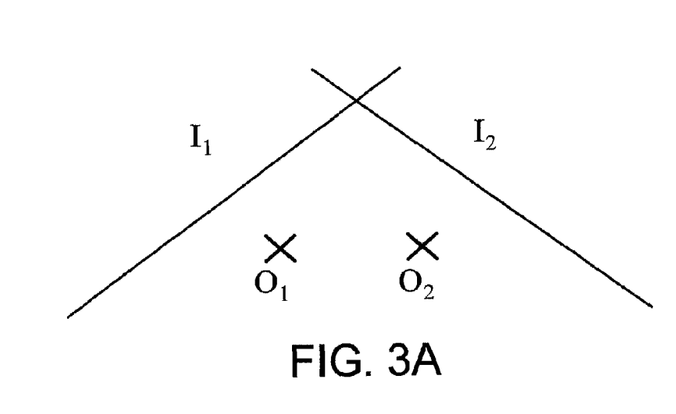
FIG. 3A is a schematic representation of two image planes, each plane having been captured or rendered from different origins and being disposed at a large angle relative to each other.
Figure 3B:
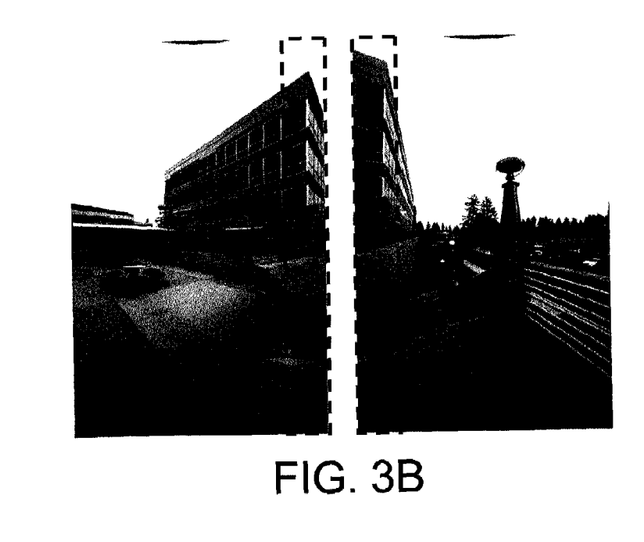
FIG. 3B provides exemplary photographic images corresponding to the image planes of FIG. 3A.

In either case, as noted above, perspective warping or rectification of an image simply means to digitally process the image so that it appears that the image was captured or rendered from the perspective of a different camera location or point of view, rather than at the position or point of view from which the image was either originally captured or rendered. For example, with respect to the MPPS techniques described herein, perspective warping of images is used to warp each image so that each image appears to be in the same plane. This concept is clearly illustrated by FIG. 3A through FIG. 4B. Specifically, FIG. 3A shows two image planes, $I_1$ and $I_2$, which have been captured or rendered from origin points $O_1$ and $O_2$, respectively. The shorter portions of both $I_1$ and $I_2$ extending past the point of intersection represent overlapping regions of $I_1$ and $I_2$. Clearly, the image plane $I_1$ is at a large angle to the image plane $I_2$. FIG. 3B provides two photographic images, with the leftmost image representing the image of plane $I_1$, and the rightmost image representing the image of plane $I_2$. The dotted rectangles on each of these two images represent the overlapping areas in common to both images.

Figure 4A:
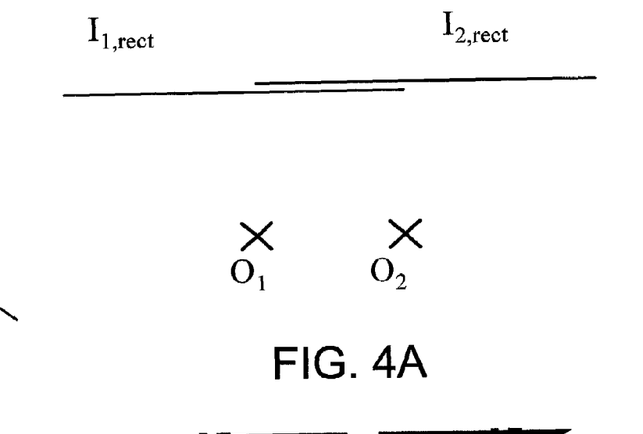
FIG. 4A is a schematic representation of the image planes of FIG. 3A following a perspective warping of the image planes to place the image planes into a common image plane.
Figure 4B:
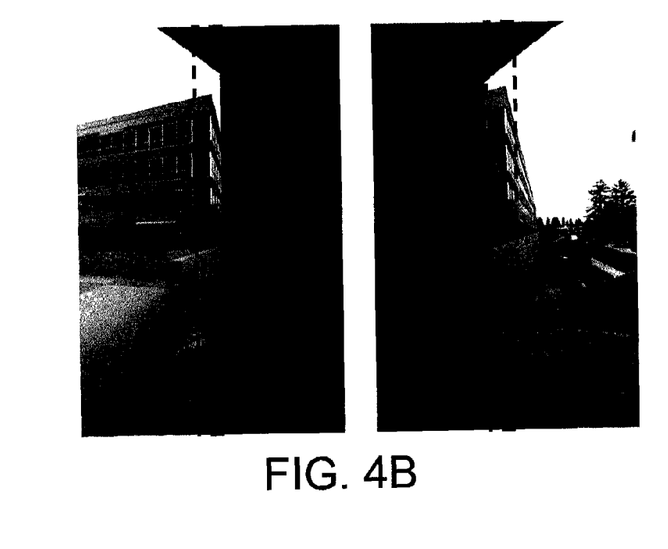
FIG. 4B provides exemplary photographic images showing the effect of the perspective warping of the images of FIG. 3B to place the images into a common image plane.

FIG. 4A illustrates the image planes for $I_1$ and $I_2$, as shown in FIG. 3A, after rectification. Note that while the points of origin for each image plane have not been modified, the image planes, now $I_{1, Rect.}$ and $I_{2, Rect.}$ have been warped into a common image plane having overlapping regions. Further, FIG. 4B shows the effect of rectification on the images of FIG. 3B, with the leftmost image of FIG. 4B corresponding to the leftmost image of FIG. 3B, and the rightmost image of FIG. 4B corresponding to the rightmost image of FIG. 3B. Again, the dotted rectangles on each of these two images represent the overlapping areas in common to both images.

3.1.2 Multi-Perspective Plane Sweep for Generation of Depth Maps:

Conventional plane sweep algorithms are useful for computing the relative depth of pixels in overlapping images. In particular, such plane sweep algorithms operate by considering each candidate disparity as defining a plane in space and projecting all images to be matched onto that plane using a planar perspective transforms (homography). A per-pixel fitness metric (e.g., the variance of the corresponding collection of pixels) is first computed, and this is then aggregated spatially using an efficient convolution algorithm such as a moving average box filter or some other conventional technique. After all the cost functions have been computed, a winning disparity is chosen. If the planes are processed in front to back order, occlusion relationships can also be included. Note that such plane sweep techniques are well known to those skilled in the art, and will not be discussed in detail herein.

Plane sweeps as described herein depart from the conventional usage described above. In particular, once the images have been rectified, any of a number of conventional alignment techniques is used to identify overlapping regions between two or more images which are to be composited. Non-overlapping regions are then associated with their respective original camera locations (or rendering origins), while each column of pixels in overlapping areas of the images are associated with virtual camera locations existing between the two original camera locations. Each of these camera locations, or rendering origins, either actual or virtual is then used in a plane sweep for computing a depth map for the overlapping portions of two or more images. For each plane or "depth," each of the overlapping views is mapped to a single reference view. The plane or depth resulting in the lowest overall error is chosen as the correct depth. This process is repeated using a different virtual camera origin for every column in the overlapping region. This modification to the conventional plane sweep is termed "multi-perspective plane sweep" (MPPS), because a plane sweep for every column in the overlapping region is computed using a different virtual camera position.

The use of such virtual camera locations serves to minimize object distortion, which is unavoidable, especially given sparsely sampled images having limited overlap, while producing a practically seamless composite image. Computing the appearance of each column within the overlapping region is then accomplished using the virtual camera positions in combination with the depth maps for pixel blending as described below in Section 3.1.3.

Also, as noted above, other methods for computing the depth of overlapping pixels can also be used. For example, in the case of actual images, a laser or radar range finder can be used with the camera to accurately measure the true depth of every pixel in the image. Similarly, in the case of many computer rendered images, the images are generated based on a three-dimensional model or models where the relative depth of all pixels in the rendered image is known at the time the image is rendered. In alternate embodiments, these depth maps are used in the same manner as the depth maps generated using the multi-perspective plane sweep.

3.1.3 Pixel Blending Using Depth Maps:

In the pixel blending step, the computed depth, whether from the MPPS, or from another depth mapping technique, is used to index the colors or grey values from the input images. Specifically, given the computed depth map at each virtual camera location, i.e., at each column, at least one vector is projected from each actual camera location through the overlapping image region to the computed depths for each pixel in each column. Next, for pixels at the same level within each column, the pixel values at the points where each of these vectors pass through the overlapping image region are then blended to create composite image pixels to replace each pixel in that column. Further, these same pixel values are assigned to each of the overlapping images such that a common composite area is created for each column of the overlapping images.

Figure 5:
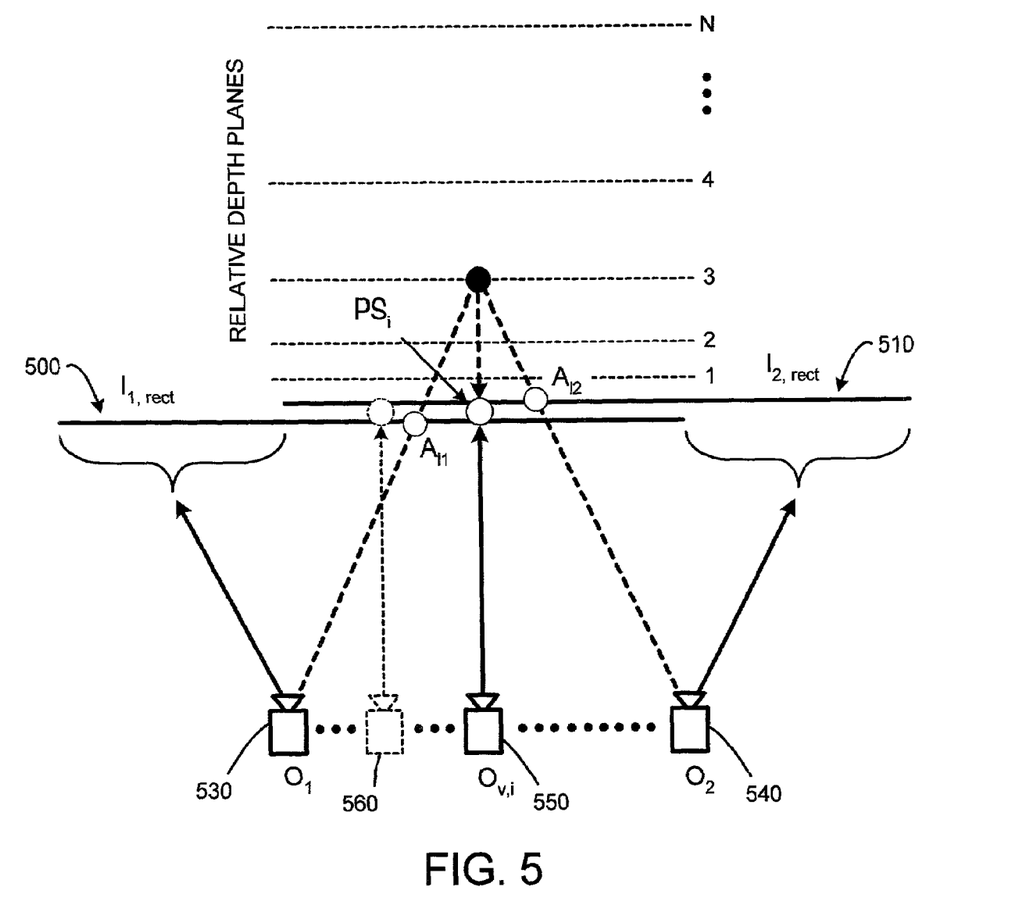
FIG. 5 is a schematic diagram that illustrates the use of depth maps and virtual camera positions for selecting pixels for blending.

These concepts are illustrated by FIG. 5. In particular, FIG. 5 is a schematic diagram that illustrates the use of depth maps and virtual camera positions for selecting pixels to be blended for creating a common composite area for each of two overlapping images. Specifically, as illustrated by FIG. 5, two overlapping images, $I_{1, Rect.}$ and $I_{2, Rect.}$, 500 and 510, respectively have been perspective warped so that they are in the same plane. Note that the offset between the two image planes, 500 and 510, as shown in FIG. 5, is merely for purpose of illustration only, and does not denote an actual offset.

Using the two image planes, 500 and 510, as an example, it is clear that there are three distinct regions: the first region, on the far right, is a portion of $I_{1, Rect.}$ which is not overlapped by any portion of $I_{2, Rect.}$; the second region, in the middle, is an area of image overlap between $I_{1, Rect.}$ and $I_{2, Rect.}$; and finally, the third region is a portion of $I_{2, Rect.}$ which is not overlapped by any portion of $I_{2, Rect.}$. Given these three regions, the first region, i.e., the non-overlapped portion of $I_{1, Rect.}$, is associated with the original camera 530, at origin $O_1$, used to capture or acquire the associated image, and is not further modified during the blending stage. Similarly, the third region, i.e., the non-overlapped portion of $I_{2, Rect.}$, is associated with the original camera 540, at origin $O_2$, used to capture or acquire the associated image, and is not further modified during the blending stage. Finally, the second region is divided into columns having a minimum width of at least one pixel, with each column being associated with a separate virtual camera 550, at virtual origin $O_{v,i}$, where i represents the current column from 0 to n which is being processed.

Given the previously computed depth map at each virtual camera location, a vector is then projected from each actual camera origin, 530 and 540, for each pixel in the column, through the overlapping image region, i.e., the region of overlap between $I_{1, Rect.}$ and $I_{2, Rect.}$, to the computed depth for each pixel in the column. For example, as illustrated in FIG. 5, the relative depth computed for one pixel for the virtual camera 550, at the virtual origin $O_{v,i}$ is on relative depth plane 3, where any number of depth planes 1 to n are available.

Given this relative depth, a vector is then extended from the virtual origin $O_{v,i}$ of the virtual camera 550 to the depth plane 3. Next, a vector is extended from both of the actual camera origins, $O_1$ and $O_2$, to the point where the vector extended from the virtual origin $O_{v,i}$ intersects depth plane 3. The points where the vectors extending from the actual camera origins, $O_1$ and $O_2$, intersect with the overlapping images correspond to pixels, $A_{f1}$ and $A_{f2}$, respectively, in the area of image overlap between $I_{1, Rect.}$ and $I_{2, Rect.}$, that are blended together to create a composite pixel, $PS_i$, for the points on both $I_{1, Rect.}$ and $I_{2, Rect.}$ where the vector extended from the virtual origin $O_{v,i}$ intersects both $I_{1, Rect.}$ and $I_2$, respectively.

This selection of pixels for blending is repeated for each pixel in each column using the previously computed image depth maps. Further, as suggested above, the same blended pixel value is assigned to each of the overlapping images for any given virtual origin $O_{v,i}$ such that a common composite area is created for each of the overlapping images.

3.1.4 Pixel Weighting for Pixel Blending:

In one embodiment, blending weights are used to weight the pixels being blended. In general, pixels are weighted based on the proximity to the edge of the overlap region and to the camera or origin used to acquire or render the image. In alternate embodiments, these blending weights are any conventional linear or non-linear weighting function.

Specifically, in one embodiment, a simple linear function for assigning blending weights to pixels is based on the proximity of each pixel being blended to the edge of the image overlap region and to the camera used to acquire the image containing that pixel. For example, if a pixel is located $\lambda_1$ pixels away from the left boundary of the overlap region (i.e., the boundary closer to a camera $C_1$) and $\lambda_2$ pixels away from the right boundary (closer to a camera $C_2$), and a mapped color from image $I_{1, rect}$ is $c_1$ and a mapped color from image $I_{2, rect}$ is $C_2$. Then, the blended color of the pixel is given by Equation 1 as:

$$\left( \frac{\lambda_2}{\lambda_1 + \lambda_2} c_1 + \frac{\lambda_1}{\lambda_1 + \lambda_2} c_2 \right) \qquad \text{Equation 1}$$

Note that while this equation represents a simple linear blending with weighting based on the distance to the camera used to capture the image, many other well known conventional linear or non-linear weightings can be used in blending pixel colors or values for determining the final pixel color or value once the pixels to be blended have been selected as described in Section 3.1.3.

3.2 System Operation:

The program modules described in Section 2.2 with reference to FIG. 2, and in view of the detailed description provided in Section 3.1, are employed for automatically deghosting overlapping portions of mosaiced images. This process is depicted in the flow diagram of FIG. 6. It should be noted that the boxes and interconnections between boxes that are represented by broken or dashed lines in FIG. 6 represent alternate embodiments of the present invention, and that any or all of these alternate embodiments, as described below, may be used in combination.

Figure 6:
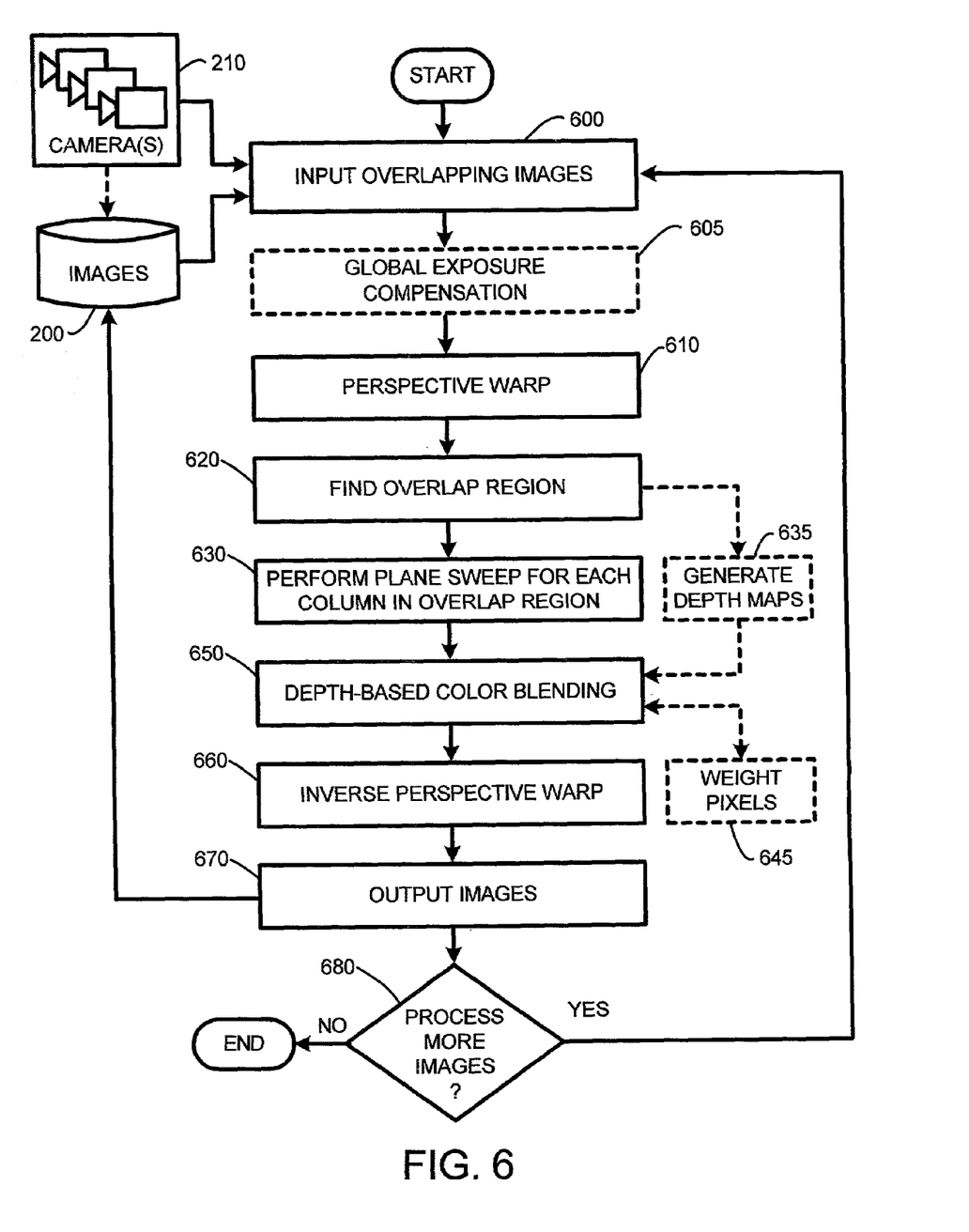
FIG. 6 illustrates an exemplary system flow diagram for using a multiperspective plane sweep to combine two or more images into a seamless mosaic.

Referring now to FIG. 6 in combination with FIG. 2, the process can be generally described as a deghosting process for overlapping portions of images of a scene. In particular, as illustrated by FIG. 6, a system and method for automatically deghosting images for use in image mosaics or panoramas uses images 200 from a database or collection of images stored in a computer readable medium. These images 200 are either captured by one or more cameras 210 or rendered using conventional computer image generation techniques. Overlapping images captured using the cameras 210 are either provided directly to the image processing modules described above, or saved to image files or databases for later processing.

In either case, in one embodiment, once the images are available, either directly from the cameras 210, or from previously stored image files 200, any of a number of conventional techniques for equalizing or compensating for exposure differences between each image is used to provide a consistent exposure between the images 605. This exposure compensation 605 addresses exposure compensation parameters such as brightness and contrast levels using conventional exposure compensation techniques that are well known to those skilled in the art, and will not be discussed in further detail herein.

Next, two or more overlapping images are input 600 to an algorithm for performing a perspective warp 610 on the images, so that the images are warped into a common viewing plane. These warped images are then further processed to locate and align 620 the overlapping portions of the images, and divide the overlapping portions of the images into columns of at least one pixel in width.

The overlapping portions of the images are then processed using a multi-perspective plane sweep 630 to generate depth maps for the overlapping regions. As discussed above, this multi-perspective plane sweep uses virtual camera positions for each column of the overlapping portions of each image to compute relative depth maps for the overlapping portions. Note that this process is discussed above in greater detail in Section 3.1.2. In alternate embodiments, also as discussed above, the depth maps are generated 635 using other techniques, such as, for example, using laser or radar range finding equipment for determining the actual depth of image pixels relative to a camera origin.

Next, using the depth maps generated either by the multi-perspective plane sweep 630, or other methods 635, image pixels are selected for color/gray level blending 650. Specifically, with respect to pixel color or gray level blending 650, the depth maps are in combination with pixel information in the overlapping portions of each image to generate a common composite pixel for each column of each of the overlapping images.

In particular, given the depth map for each column of the overlap region, a vector is projected from each actual camera location through the overlapping image region to the computed depth for each pixel in each column. Next, for pixels at the same level within each column, the pixel values at the points where each of these vectors pass through the overlapping image region are then blended to create composite image pixels to replace the pixels comprising each column of the overlap region. The same color or gray level assigned to the composite pixel is then assigned to each of the overlapping images at a point corresponding to the current virtual camera. Consequently, for each column a common composite area is created for each of the overlapping images. Having a composite area serves to reduce or eliminate distortion, blurring and ghosting resulting from image parallax. This process is discussed in greater detail in Section 3.1.3.

In a related embodiment, blending weights are used to weight 645 the pixels being blended. In particular, those pixels that are closer to a camera or rendering point are weighted 645 more heavily than those pixels that are further from a camera or rendering point. In other words, the pixels are weighted 645 based on the proximity to the edge of the overlap region and to the camera or origin used to acquire or render the image. In further embodiments, these blending weights are determined using any conventional linear or non-linear weighting function.

Finally, a reverse or inverse perspective warp 660 is applied to the images for exactly reversing or inverting the original perspective warping 610 applied to the images. Consequently, the images are put back into their original perspectives. However, these output images 670 differ from the original input images in that they now have a common overlap area that differs only in the perspective from which the images were captured or rendered, with any potential ghosting or blurring effects minimized or eliminated by the aforementioned pixel blending procedures. These output images are then stored to computer files or databases 200 for later use in viewing or creating image mosaics or image panoramas.

The processes described above are then repeated so long as there are more overlapping images to process 680. Note that particular images may overlap one or more different images on each image border, and that particular images may therefore be repeatedly processed as described above for each unique overlap case. For example, in a 360-degree panorama, any given picture may have four or more images at least partially overlapping either all or part of that images edges or borders. In such a case, all overlap cases are processed individually so that in the end, each of the overlapping images will have at least some common overlap areas that differ only in the perspective from which the images were captured or rendered.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for blending pixels in overlapping images of a scene comprising using a computing device to perform the following steps:
   determining an area of overlap between at least two images having a common viewing plane;
   dividing the area of overlap into at least one column of image pixels, each column having a width of at least one pixel;
   computing a depth map for each column;
   identifying pixels from at least one image that correspond to the depth map;
   blending at least two identified pixels wherein a composite image pixel is produced by blending the at least two identified pixels; and
   assigning each composite pixel to the column used for identifying the pixels blended to produce the composite pixel.

2. The system of claim 1 wherein the composite pixel is assigned to a portion of each overlapping image represented by the column so that the composite pixel is common to each overlapping image.

3. The system of claim 1 wherein at least two overlapping images of a scene having different perspective viewing planes are warped to bring each image into the common viewing plane prior to determining the area of overlap between the at least two images.

4. The system of claim 1 wherein the depth map for each column is computed by using a plane sweep from a virtual origin perpendicular to each column.

5. The system of claim 1 wherein the depth map for each column is computed using pixel distances measured by a laser range finder at the time each image was acquired.

6. The system of claim 1 wherein the depth map for each column is computed using pixel distances measured by a radar range finder at the time each image was acquired.

7. The system of claim 1 further comprising aligning overlapping image areas prior to dividing the area of overlap into at least one column.

8. The system of claim 1 further comprising compensating for exposure variation between overlapping images by adjusting an exposure of at least one of the overlapping images so that the exposure is consistent between the overlapping images.

9. The system of claim 1 further comprising weighting each identified pixel prior to pixel blending.

10. The system of claim 1 wherein a linear weighting that is a function of a proximity to an edge of the area of overlap and to the point of origin for each image is applied to each identified pixel prior to pixel blending.

11. The system of claim 1 wherein pixel blending is achieved by averaging the pixels that are blended.

12. The system of claim 9 wherein pixel blending is achieved by averaging the weighted pixels that are blended.

13. The system of claim 3 further comprising warping each image back to its original perspective viewing plane after pixel blending.

14. The system of claim 1 wherein at least one of the overlapping images of a scene is acquired using at least one camera.

15. The system of claim 1 wherein at least two cameras having overlapping fields of view are used to acquire overlapping images of a scene.

16. A computer-implemented process for generating a common composite area for overlapping images comprising using a computer to:
input two or more overlapping images;
warp each overlapping image into a common viewing plane;
align an overlapping region of the two images;
divide the overlapping region into at least one column of image pixels, each column having a width of at least one pixel;
compute a depth map for each column;
identify pixels in each image that are intersected by a vector projected from a point of origin for each image to at least one point in the depth map for each column as each of those vectors passes through the common viewing plane; and
blend at least one identified pixel from each image with at least one identified pixel from at least one overlapping image for pixels at the same level within each column to create common composite pixels for each overlapping image.

17. The computer-implemented process of claim 16 wherein the depth map for each column is computed by using a plane sweep from a virtual origin aligned with each column.

18. The computer-implemented process of claim 16 wherein the depth map for each column is computed using actual pixel measurements.

19. The computer-implemented process of claim 16 wherein blending the pixels is achieved by a weighted averaging of the pixels that are blended.

20. The computer-implemented process of claim 16 further comprising warping each image back to its original viewing plane after pixel blending.

21. A computer-readable medium having computer executable instructions for automatically blending pixels to create common composite pixels in at least two overlapping images, said computer executable instructions comprising:
input at least one pair of partially overlapping images;
warp each pair of images into a common viewing plane;
identify and align an overlapping region of the pair of images;
divide the overlapping region into a set of columns of one pixel in width;
compute a depth map for each column using a plane sweep in combination with a virtual viewing origin for mapping pixel depths throughout each column;
identify pixels in each image pair that are intersected by a vector projected from a point of origin for each image to at least one point in the depth map for each column as each of those vectors passes through the common viewing plane; and
blend at least one identified pixel from each image with at least one identified pixel from at least one overlapping image for pixels at the same level within each column by averaging the identified pixels to create at least one composite pixel.

22. The computer-readable medium of claim 21 wherein the averaging is a weighted averaging.

23. The computer-readable medium of claim 21 further comprising an inverse warping of the images following pixel blending to place each image back into an original viewing perspective.

24. The computer-readable medium of claim 21 wherein each composite pixel replaces each corresponding pixel in each corresponding column of the overlapping region.

25. The computer-readable medium of claim 24 wherein replacing each corresponding pixel in each corresponding column serves to create a set of composite columns that are common to each overlapping image.

26. The computer-readable medium of claim 23 wherein the inverse warped images are stored to a computer readable medium.

* * * * *

UNITED STATES PATENT AND TRADEMARK OFFICE
CERTIFICATE OF CORRECTION

PATENT NO. : 7,006,709 B2
APPLICATION NO. : 10/172859
DATED : February 28, 2006
INVENTOR(S) : Sing Bing Kang et al.

It is certified that error appears in the above-identified patent and that said Letters Patent is hereby corrected as shown below:

In column 12, line 10, delete "$1_2$," and insert -- $I_2$, --, therefor.

In column 14, line 17, after "$I_2$," delete ",".

In column 14, line 42, delete "$C_2$" and insert -- $c_2$ --, therefor.

Signed and Sealed this

Eighteenth Day of August, 2009

David J. Kappos
*Director of the United States Patent and Trademark Office*